April 2, 1968     E. D. HOUGEN     3,375,693

APPARATUS FOR CLEANING SHEET METAL PREPARATORY TO SPOT WELDING

Filed Jan. 8, 1964     2 Sheets-Sheet 1

INVENTOR.
EVERETT D. HOUGEN
BY
Barnes, Kisselle, Raisch, & Choate
ATTORNEYS

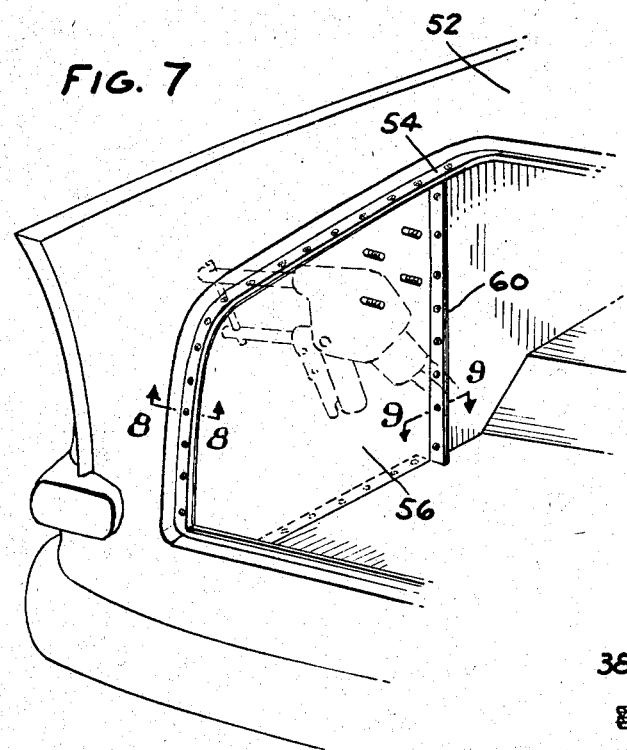
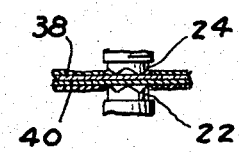
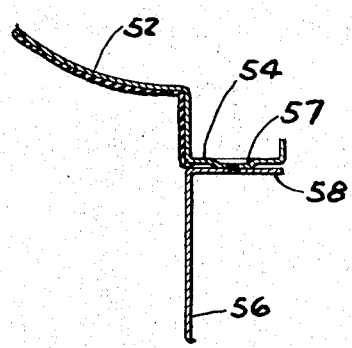
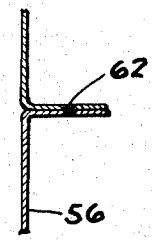

United States Patent Office 3,375,693
Patented Apr. 2, 1968

3,375,693
APPARATUS FOR CLEANING SHEET METAL PREPARATORY TO SPOT WELDING
Everett D. Hougen, Box 174, Flushing, Mich. 48433
Filed Jan. 8, 1964, Ser. No. 336,507
5 Claims. (Cl. 72—353)

ABSTRACT OF THE DISCLOSURE

A tool for cleaning sheet metal panels preparatory to spot welding in the form of vise grip pliers having metal scraping studs on the inner faces of the jaws adapted when the jaws are closed to be clamped in pressure engagement with the sheet metal panels interposed therebetween so that when the pliers are swung in an arc the metal scraping studs are adapted to clean localized areas on opposite sides of the panels.

This invention relates to a method and apparatus for cleaning localized areas on sheet metal panels preparatory to spot welding.

In the automotive body repair trade it frequently becomes necessary to replace damaged panels on a vehicle with new ones. This involves removal of the old panel and securing a new panel in place of the old one. The desirability of securing new panels in place by means of spot welding as distinguished from arc welding, brazing, etc., has long been recognized, but this method of securing new panels in place has not been too popular or widely used because of the necessity and difficulty of obtaining a clean metal surface in the location of the spots to be welded. Most new body panels have a coat of at least primer paint applied thereto which must be removed in order to obtain sound welds. Likewise most frequently it happens that the body panel to which the new panel is to be secured is covered with paint, dirt, body deadener, etc. The cleaning of such panels is usually performed by electric disc sanding, but this operation in most cases is awkward, dangerous and almost impossible. Wire brushing by hand is likewise usually relatively ineffective. For example, body deadener compound invariably just loads up grinding discs and wire brushes and smears over the panel. Body repairmen have also resorted to the use of an acetylene flame to burn off body deadener. This torch method of cleaning panels is dangerous not only from the standpoint of a fire hazard, but also because of the hot body deadener sometimes dropping onto the bodyman, especially when he is working on bodies, under the wheel housing, rocker panels and floor panels. Because of these problems in cleaning the sheet metal, the use of spot welding in replacing body panels has been used only infrequently.

It is an object of this invention to facilitate the replacement of body panels by spot welding by providing a tool and a method which facilitates tremendously the cleaning of body panels preparatory to spot welding.

More specifically, it is an object of this invention to provide a simple tool and method which not only facilitates the cleaning of body panels but also greatly improves the quality of the repair work performed on damaged or rusted-out cars. The tool and method of this invention in combination with a spot welding operation now enable the body repair man to attain factory quality in welding, sealing joints and appearance in an economical and practical manner.

Other features and objects of the invention will become apparent from the following description and drawings:

FIGURE 7 is a fragmentary perspective view illustrating the manner in which a body panel cleaned in accordance with the present invention may be spot welded to existing body panels.

FIGURE 8 is a sectional view along the line 8—8 in FIGURE 7.

FIGURE 9 is a sectional view along the line 9—9 in FIGURE 7.

FIGURE 10 illustrates the manner in which the tool of this invention may be used to clean two panels simultaneously.

Figure 1:
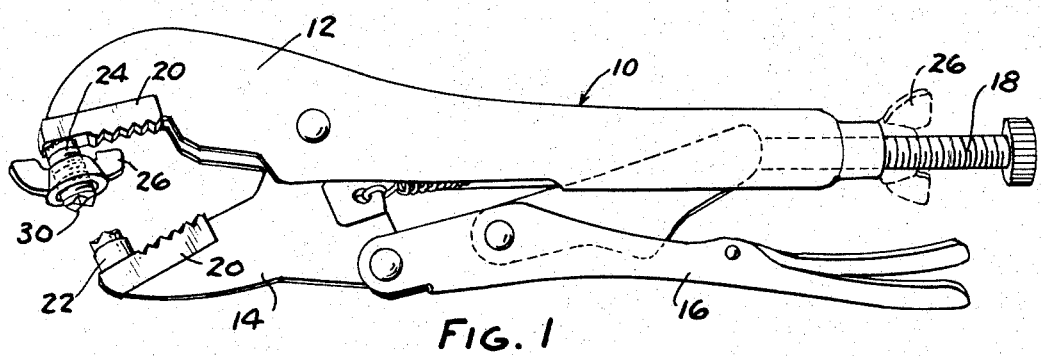
FIGURE 1 is a perspective view of a tool according to the invention.
Figure 2:
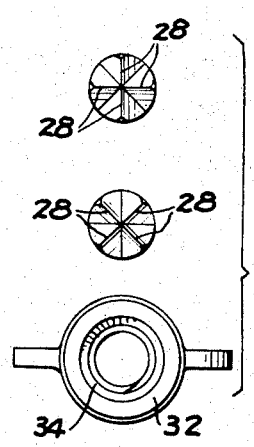
FIGURE 2 illustrates the tips employed on the tool.

Referring to the drawings, there is illustrated in FIGURE 1 a more or less conventional tool known as a vise grip pliers modified slightly to produce the tool of the present invention. The tool, generally designated 10, includes a pair of jaws 12, 14 and a toggle linkage 16 for locating the jaws 12, 14 in clamped position. The linkage cooperates with an adjusting screw 18 for varying the locking position of jaws 12, 14. Each jaw 12, 14 has mounted thereon a hardened jaw plate 20 and each of the jaw plates 20 have secured thereto as by weld, brazing, etc., a tip in the form of a stud member. The stud member on the lower jaw of the tool, as illustrated in FIGURE 1, is designated 22 and the stud on the upper jaw member is designated 24. It will be observed that the stud member 24 is longer than the stud member 20 and is threaded to receive a wing nut 26. The opposed ends of the studs 22, 24 are similarly configured and are provided with a plurality of scraping edges 28. As is shown in FIGURE 2, the scraping edges 28 emanate radially outward from the center of the end face of the studs and these scraping edges are formed in such end face by grinding or otherwise forming a plurality of radially extending V shaped grooves 30 in the end faces of the studs. These grooves 30 taper in depth radially so that they are shallow towards the center of the stud and deep around the outer periphery of the stud. Thus the scraping edges 28 form radially extending crests between adjacent grooves 30. Edges 28 lie in a flat plane perpendicular to the longitudinal of each stud.

Wing nut 26 is a conventional article of manufacture and at the leading end face 32 thereof it is formed with a chamfer 34 around the threaded opening thereof. Wing nut 26 is threaded on stud 24 with its leading end face and chamfer 34 facing the end of the other stud 22 on the lower jaw of the tool. The thread on stud 24 is the same size as the thread on adjusting screw 18 so that when wing nut 26 is not being used on stud 24 it can be stored on adjusting screw 18 as shown in broken lines in FIGURE 1.

Figure 3:
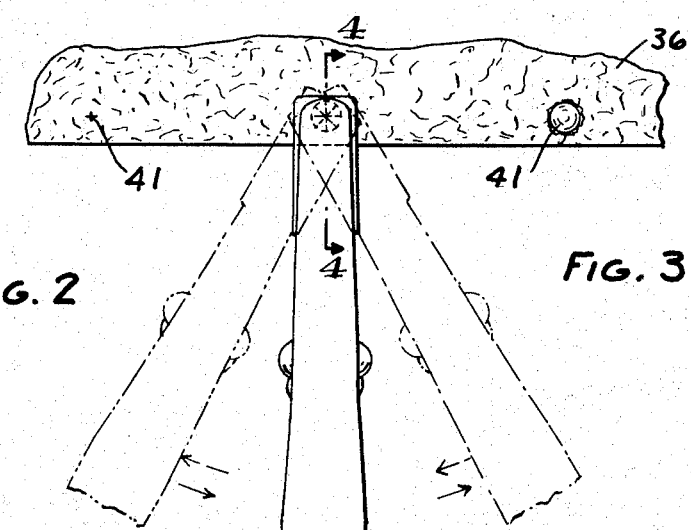
FIGURE 3 is a planed view illustrating the manner in which the tool is used for cleaning localized areas on a sheet metal panel.
Figure 4:
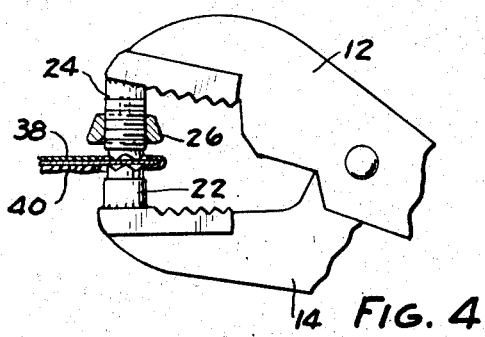
FIGURE 4 is a fragmentary side elevational view, partly in section, illustrating the manner in which the opposite faces of a sheet metal panel can be cleaned.

Referring now to FIGURES 3 and 4, a body panel to be cleaned is illustrated at 36. As is usual with such body panels, there is a coating of paint 38 on one face thereof and there is a coating of dirt, body deadener, etc., 40 on the other side of the body panel. Assuming that it is decided to spot weld a new body panel to panel 36, it becomes necessary to clean localized areas 41 on opposite faces of panel 36 in order to obtain sound spot welds.

The tool illustrated in FIGURE 1 is admirably suited for this purpose.

To clean a localized area 41 on opposite faces of panel 36 the jaws 12, 14 of the tool are opened and then brought together against the opposite faces of the panel at the area to be cleaned. Screw 18 is adjusted so that when the toggle linkage 16 is properly actuated the opposed faces of the two studs 24 will be firmly clamped against the opposite faces of the panel. In view of the shape of the scraping edges 28, when the stud members 22, 24 are clamped against the panel, the scraping edges cut through the coating of paint and body deadener on the opposite faces of the panel and dig into the metal itself. Thereafter, with the studs 22, 24 clamped against the body panel, as described when the tool is swung from side to side as illustrated in FIGURE 3, the scraping edges 28 effectively scrape the surface of the body panel to present a bare metal surface admirably suited for spot welding.

The effectiveness of this tool for cleaning dirty body panels is attributable to the combined action of the scraping edges 28, the clamping pressure applied to the scraping edges, and the configuration of the scraping edges. By forming the scraping edges as the crests of the adjacent radially extending tapered troughs, I have found these scraping edges not only penetrate through foreign matter on the surface of a panel, but also facilitate the discharge or removal of foreign material from between the scraping edges when the tool is rotated or swung from side to side in the plane of the panel. This results from the fact that the space between adjacent scraping edges 28 is in the nature of a groove the cross section of which gradually increases in a radially outward direction, thus as the two studs are squeezed in or clamped against a panel and rotated, the foreign matter engaged by the sloping faces of the grooves 30, is caused to gradually work its way in a radially outward direction. Thus there is no tendency for the foreign matter, particularly the body deadener, to build up solid between the scraping edges and render them ineffective for scraping the surface of the panel. Experience has shown that with most all panels after the studs are clamped against the face of the panel, it is only necessary to swing the tool from side to side several times before a clean bare metal surface is produced.

Figure 5:
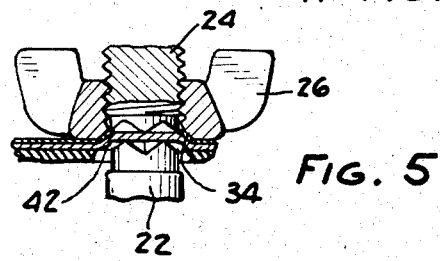
FIGURE 5 is a view similar to FIGURE 4 and illustrating how the sheet metal panel may be provided with a weld projection with the tool of the present invention.

In some repair operations it is necessary, or at least desirable, to form projections on one of the panels to be spot welded. Such projections are conventionally formed in body repair shops by striking the metal with a flat ended punch. The tool of the present invention eliminates the necessity for forming projections in this crude and unreliable manner. Referring to FIGURE 5, the tool is there illustrated showing the adjustment of wing nut 26 for forming such projections. In the arrangement illustrated it will be observed that wing nut 26 is threaded on stud 24 so that the chamfer portion 34 projects downwardly below the end face of stud 24. With nut 26 adjusted in this manner, when the two jaws 12, 14 are brought into clamping engagement with the panel the interaction of the lower stud 22 with the chamfer surface 34 of the nut 26 causes the metal of the panel to be embossed as illustrated and to form projection 42. While it is preferred to form the projection 42 after the metal has been cleaned as illustrated in FIGURE 4, it is feasible to both emboss the panel and clean it by initially adjusting nut 26 to the position illustrated in FIGURE 5.

Figure 6:
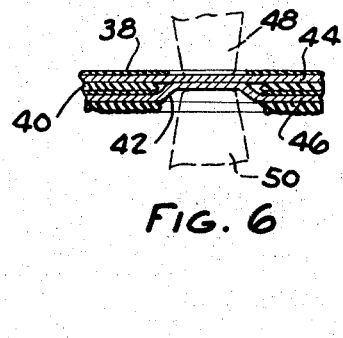
FIGURE 6 is a sectional view showing the manner in which a cleaned body panel provided with the projection illustrated in FIGURE 5 can be spot welded to another body panel.

Referring now to FIGURE 6, it will be noted that the two panels there illustrated—one flat panel being designated 44 and the other panel 46 provided with the projection 42, have their opposite faces cleaned at localized areas to enable them to be spot welded together in a convenient manner as by the use of opposed electrodes 48, 50. In the illustrated arrangement it will be noted that the area of the panel adjacent a cleaned portion has a paint layer 38 on one side and a heavier coating of dirt, deadener, etc., 40 on the opposite side. The projection 42 enables the juxtaposed cleaned portions of the panels to be brought into intimate contact required for spot welding without interference from the adjacent coated areas of the panels. Obviously it will be appreciated that the depth of the embossment or projection 42 can be varied as desired by the thread adjustment of nut 26 or stud 24.

In addition to cleaning the panel and forming a weld projection thereon, the tool of this invention also serves another very useful purpose in connection with replacement of body panels by spot welding. When the studs 22, 24 are clamped against opposite faces of a panel and the tool is rotated in the plane of the panel, the scraping edges 28 produce a smoothing action so as to eliminate any surface irregularities at the spots to be welded. This is important from the standpoint of producing sound welds.

In FIGURES 7 through 9 there is illustrated a typical body repair operation in which the present invention may be utilized. In the arrangement illustrated in FIGURE 7 the rear deck of a vehicle body is designated 52 and the opening for the trunk lid is shown therein. As is conventional, the peripheral edge of the trunk opening is formed as a channel 54. The operation here illustrated involves the replacement of a panel 56 within the trunk which is secured at least along a part of its periphery to the channel 54. The material of channel 54 is adapted to be readily cleaned of paint, body deadener, etc., by the tool illustrated in FIGURE 1. It will be observed that the lengths of stud 24 and stud 22 are such that the tool can be engaged within the channel 54 and rotated to clean successive localized areas without interference. Along the channel 54 the metal is cleaned and formed with a plurality of projections 57 to facilitate spot welding the channel portion to the flange portion 58 of the panel 56. Along the vertical joint indicated at 60 the two flanges are cleaned by the method and tool described herein without forming an embossment or projection therein and are thereafter spot welded as at 62. While FIGURE 7 shows the replacement of a body panel adjacent the trunk opening of a vehicle, it will be appreciated that this is merely typical of many damaged body panels that can be replaced utilizing spot welding and the tool and method of the present invention.

In many repair operations the inner faces of the two panels that are to be spot welded together are relatively clean and it is only the outer faces of the panels which have to be cleaned. In such operations, after the first spot weld is effected, the exposed surfaces of the two panels can be cleaned for further spot welds by simply clamping the jaws of the tool against the outer exposed surfaces of the two panels, as illustrated in FIGURE 10, and the tool rotated as described previously to provide the disc-shaped spots of bare metal required for the subsequent spot welds.

I claim:

1. A tool for cleaning localized areas on opposite sides of a sheet metal panel preparatory to spot welding which comprises a pair of opposed scraping members for engaging opposite sides of a panel at juxtaposed areas, power applying means inter-connecting said members for enabling the members to be brought into pressure engagement with the opposite faces of the panel, said scraping members each comprising a stud-like member one end face of which is adapted to engage the panel, said end face of the stud-like member having a plurality of grooves therein, the adjacent grooves intersecting to form crests which serve as scraping edges, the scraping edges on each stud lying in a plane perpendicular to the axis of the stud and forming the axially outermost end surface of the stud and means on one of said studs surrounding and projecting axially beyond said one end face for embossing the metal of the panel when the studs are brought into pressure engagement with the opposite faces of the panel.

2. A tool for cleaning localized areas on opposite sides of a sheet metal panel preparatory to spot welding which comprises a pair of opposed scraping members for engaging opposite sides of a panel at juxtaposed areas, power applying means inter-connecting said members for enabling the members to be brought into pressure engagement with the opposite faces of the panel, said scraping members each comprising a stud-like member one end face of which is adapted to engage the panel, said end face of the stud-like member having a plurality of grooves therein, the adjacent grooves intersecting to form crests which serve as scraping edges, the scraping edges on each stud lying in a plane perpendicular to the axis of the stud and forming the axially outermost end surface of the stud, one of said studs being threaded and a nut member on said threaded stud, the end face of the nut member adjacent said one end face of the stud having a chamfer around the threaded opening therein, said nut member being adjustable on the stud to a position wherein said end face of the nut member projects axially beyond said end face of the stud whereby when the studs are brought into pressure engagement with opposite faces of the panel, the panel is embossed to form a weld projection therein.

3. A tool for cleaning localized areas on opposite sides of a sheet metal panel preparatory to spot welding which comprises a pair of jaws pivotally connected together for movement toward and away from each other, each jaw having a stud-like member thereon extending generally perpendicular to the pivotal axis of the jaws, said stud-like members being axially opposed such that when the jaws are pivoted towards each other in the closing direction the inner opposite ends of the stud-like members are adapted to engage opposite faces of a sheet metal panel interposed therebetween, the inner opposite ends of the stud-like members each containing a plurality of grooves therein extending radially from the axial center of the stud-like member to the outer periphery thereof, said grooves being defined by radially extending teeth having sloping side walls which intersect to form radially extending sharp crests emanating from the axial center of the stud-like member, the crests on each of the stud-like members all lying in a substantially flat plane, each of said jaws having a handle associated therewith for opening and closing the jaws and a toggle linkage interconnecting said handles for locking the jaws in closed position with the inner opposed ends of the stud-like members in pressure-clamped engagement against the opposite faces of a sheet metal panel interposed therebetween.

4. A tool as called for in claim 3 wherein each of said grooves is progressively deeper in a radially outward direction.

5. A tool as called for in claim 3 including means on one of said stud-like members surrounding and projecting axially beyond the inner end face thereof for embossing the metal of the panel when the studs are brought into pressure-clamped engagement with the opposite faces of the panel.

References Cited

UNITED STATES PATENTS

| 1,229,700 | 6/1917 | Auel | 29—488 X |
| 1,242,171 | 10/1917 | Geisenhoner | 29—488 X |
| 1,843,675 | 2/1932 | Hosking | 81—5.1 X |
| 2,363,990 | 11/1944 | Priebe | 29—81 |

FOREIGN PATENTS 524,348   8/1940   Great Britain.

MORRIS O. WOLK, *Primary Examiner.*

MICHAEL E. ROGERS, *Examiner.*

D. G. CONLIN, *Assistant Examiner.*